July 17, 1956 J. P. LAWLOR 2,754,971
MULTICELL FILTER APPARATUS
Filed June 27, 1952
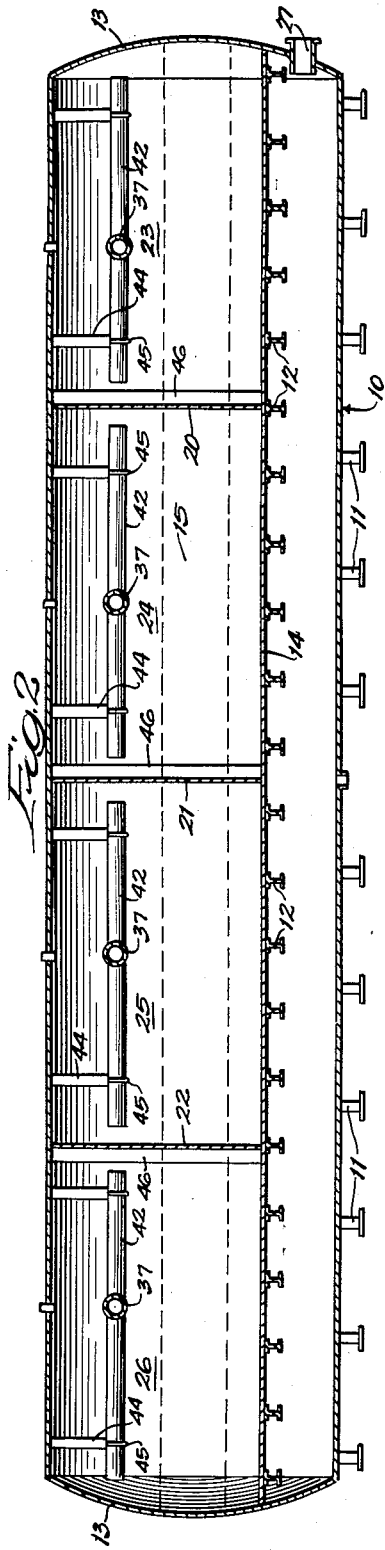
INVENTOR:
Joseph P. Lawlor,
BY
Dawson & Ooms,
ATTORNEYS.

United States Patent Office 2,754,971
Patented July 17, 1956

2,754,971

MULTICELL FILTER APPARATUS

Joseph P. Lawlor, Ames, Iowa, assignor to General Filter Company, Ames, Iowa, a corporation of Iowa Application June 27, 1952, Serial No. 296,008

2 Claims. (Cl. 210—144)

This invention relates to multicell filter apparatus. The invention is particularly useful in connection with a single large horizontal filter employing partitions for forming compartments therein.

For many pressure filtering applications, a single large horizontal filter is an ideal solution from the standpoint of simplicity and low initial cost. Such filters, however, have a definite drawback in the very large flow required for backwashing.

When it is impractical or impossible to obtain or dispose of enough water to backwash such a large single filter, the practice has been to provide the required filter areas in the form of several smaller units, each of the units being a complete filter in itself.

It has long been desired to have a single large horizontal filter divided into a number of cells, each of which can be backwashed adequately with the water flow available for the purpose, and various methods of compartmenting horizontal filters have been tried by filter manufacturers. Complete isolation of the cells by means of partitions constructed of standard dished heads has proved to be satisfactory in so far as withstanding the pressure is concerned. This method, however, has a disadvantage in that the filter bed against the convex side of the partition does not operate well due to the shape of the partition. Further, the fabrication is difficult and there is little or no saving in cost over the use of an equal number of individual filters.

Another system has been employed which permits the use of flat plate partitions by providing for pressure equalization between the cells. This is accomplished by providing an opening at the top center of the partition large enough to pass the full flow of water available at very low head loss across the opening. In spite of this design, care is required to insure that there will be no great pressure differential across the partition. Further, the backwash water moves through the openings from the cell being backwashed, and deposits material on the cells that have been cleaned.

There has long been a need for a multicell horizontal filter in which backwashing can be effected readily through selected cells by employing a limited flow of water.

An object of this invention is to meet the above need and to provide a structure in which a very limited amount of water flow may be employed effectively in backwashing a selected cell or cells of the filter. A further object is to provide a structure in which all the advantages of a large horizontal compartmented filter may be enjoyed while permitting a very small flow to be employed for backwashing through the selected washing of individual cells. A still further object is to provide in such a filter structure an underdrain system in which it is impossible to produce a damaging difference in pressure across the partitions. Yet another object is to provide in such a multicell horizontal filter structure an underdrain plate which is common to all of the cells and in which the only pressure differential that can be developed across the partitions is that head loss produced by flow through the filter bed during service and through the underdrain plate during backwash. Other specific objects and advantages will appear as the specification proceeds.

The invention is shown in an illustrative embodiment by the accompanying drawing, in which—

Figure 1 is a side view in elevation of filter apparatus embodying my invention; Fig. 2, an enlarged longitudinal sectional view of the compartmented filter; Fig. 3, a transverse sectional view; and Fig. 4, an enlarged detail sectional view showing the baffle plate structure employed with the underdrain plate.

In the illustration given, 10 designates a large horizontal filter vessel or tank supported upon standards 11. Extending transversely of the filter vessel are spaced I beams 12, as shown more clearly in Fig. 2. The filter is provided with outwardly-dished ends 13. Supported upon the I beams 12 is an underdrain plate 14 which divides the interior of the vessel into an upper filter space 15 and a lower drain or inlet chamber 16. The drain plate 14 is provided throughout with spaced openings 17 establishing communication between the lower drain chamber 16 and the upper chamber 15. I prefer to employ with each of the openings 17 a lower plate 18 and an upper baffle plate 19 which permits the water to flow upwardly and then laterally under the filter bed 19a, as shown more clearly in Fig. 4. The underdrain plate and the baffle plate structures therefor are shown in greater detail in my Patent 2,594,568, dated April 29, 1952.

Extending upwardly from the drain plate 14 at spaced intervals are three partition walls 20, 21 and 22. It will be understood that any number of partition walls may be employed, and that the use of three partitions herein is merely illustrative of the invention. By the use of the partition walls 20, 21 and 22 and the dished ends 13 of the filter, I provide four compartments, as indicated by the numerals 23, 24, 25 and 26.

Any suitable means may be provided for the inflow and outflow of water. In the illustration given, the chamber 16 below the plate 14 is provided with an outlet fitting 27 to which is connected a valve-controlled pipe 28, as shown more clearly in Fig. 1. For the inflow of water, I provide a pipe 29 leading from a pump 30 and connected with pipe 31 adapted to feed water to the compartment 26, pipe 32 adapted to feed water to the compartment 25, pipe 33 adapted to feed water to the compartment 24, and pipe 34 adapted to feed water to the compartment 23. It will be understood that the water supplied through the line 29 may come from any suitable source of supply, and the pump 30 is herein set out merely as illustrative of a source.

Each of the pipes 31, 32, 33 and 34 is provided with a control valve 35 and is connected by a T fitting 36 to a pipe 37 leading into the interior of the compartment. The T fitting 36 also connects pipe 31 to a valve-controlled discharge pipe 38 leading the water to a drain 39 from which water drains away through the channel 40, as shown more clearly in Fig. 1. The valve controlling the drain pipe 38 is indicated by the numeral 41.

The pipe 37 leading into each of the compartments preferably joins a longitudinally-extending spray pipe 42 having spaced overflow ports 43. The pipe 42 in each compartment is supported by brackets 44 and suspension straps 45 carried thereby.

The partitions 20, 21 and 22 are preferably braced by vertical members 46, as shown more clearly in Figs. 2 and 3. It will be understood that the structure may be varied widely with respect to the fabrication of the compartments and the supporting means for the partitions, drain plate, etc.

In the filter structure resulting from the use of the parts hereinbefore described, there are provided four separate compartments 23, 24, 25 and 26, with the walls thereof imperforate except with respect to the bottom wall which is formed by the drain plate 14. The drain plate is provided throughout with a large number of spaced openings 17 which thus provided free flow between the several compartments and the unitary or unobstructed chamber or passage 16 therebelow. The passage 16 thus provides a common chamber communicating with each of the compartments.

*Operation*

In the operation of the apparatus for service, water is passed through the line 29 into the several compartments and it flows through the filter bed, underdrain plate 14, and thence is discharged through the outlet pipes 27 and 28 to its desired destination. Since the operation of the filter for service is well understood and involves no special problems, it is believed unnecessary to describe further the filtering operation.

The main problem, as stated above, has had to do with the backwashing of the cells or compartments in the filter, and this problem centers about the fact that the required flow of water is limited. It is desired to wash the large compartmented filter with as little a water flow requirement as possible. Various methods for handling the backwash through the multicell filter shown may be employed. For example, the following four methods may be described and the particular method used will depend upon the design requirements of the plant in question:

(1) In this method the backwash is with treated water under pressure from the system storage, for example, where the filter is treating a municipal supply and there is an elevated tank close enough to supply water at a rate sufficient to backwash one cell at a time without lowering the pressure in the system.

(2) In this method, the backwash is with treated water supplied from a pump from a storage reservoir. An example would be where the filter water is being discharged into a reservoir at an elevation too low to give sufficient pressure for backwashing. Occasionally, a separate storage reservoir is provided at the plant for the express purpose of supplying backwash water.

(3) In this method each cell is backwashed with filtered water from the other cells. One example of this method would be in the operation of a multicell filter for filtration of swimming pool water. Here the only water available for backwashing is supplied by the recirculating pump. Enough cells must be provided to get the area down to the point where the recirculating pump will supply adequate flow to backwash each cell. This system is also used in industries where space will not allow construction of storage tanks large enough for the backwash supply.

(4) This method would be a combination of methods 1 and 3, and it is used where it is determined that there is not enough water available from storage and it is necessary to provide additional water from the source of supply.

In the specific example where it is desired to backwash cells separately, as, for example, using filtered water such as water sent to a swimming pool, the water is pumped through pipe 29 through, for example, pipes 31, 33 and 34, so as to filter through the filter beds in compartments 23, 24 and 26. In each instance, the valve 41 of the drain pipe 38 leading from these cells or compartments is closed. In the case of cell or compartment 25, the valve 35 of pipe 32 is closed and the valve 41 of drain pipe 38 therebelow is opened. Also, valve 28 in the withdrawal pipe 27 is closed. The incoming water passing through the compartments 23, 24 and 26 fills the chamber 16 and then passes upwardly through the openings 17 in the underdrain plate 14 into the filter bed 19a in compartment 25 and backwashes the filter. The water level rises upwardly through the filter and above the pipe 42 and then passes outwardly through pipe 42 and the pipe 37 leading from compartment 25 and thence downward through the pipe 38 to the drain 39. Thus, with a relatively small flow of water, the filter in compartment 25 is backwashed. By manipulating the valves 35 and 41 for the different compartments, it is thus possible to backwash each of the filters one at a time while employing the entire water flow for effecting such backwashing.

From the foregoing it will be noted that an extremely large single horizontal filter with any desired number of compartments may be employed for effective service filtration while at the same time permitting selective backwashing of one or more cells at a time while employing all of the water flow for this purpose. It is not necessary to have all the flow required for backwashing all of the cells at one time, but instead, backwashing may be limited to a single cell and the entire available flow may be utilized for the backwashing of this selected cell or cells.

In the operation described, the use of the non-clogging and non-restrictive underdrain pipe and the common passage 16 therebelow accounts of much of the successful operation. If an underdrain plate is employed which can clog and cause flow to be restricted, it will be possible to produce a damaging pressure differential across the cell partitions. Obviously, separate underdrains for the individual cells would cause the worse condition. In those systems where small nozzles are provided and in which header lateral systems are used, the small nozzles and the laterals become clogged with scale or debris from the mains, and as soon as the clogging occurs the backwash operation produces large differentials.

By employing the baffle plates to provide free upward flow of the water under the baffle plate, there is no tendency for the system to clog and the multicell operation is effective. There is no clogging and no backwash pressures which will bulge the plates, etc.

While in the foregoing specification I have shown a specific structure in considerable detail for the purpose of illustrating the invention, it will be understood that such details of structure may be varied widely by those skilled in the art without departing from the spirit of my invention.

I claim:

1. In a water filtration apparatus, a horizontally-elongated tank, partitions arranged within said tank to provide a plurality of separate, horizontally-spaced, vertically-extending filter cells within said tank, said cells being adapted to receive separate beds of filtering material, a raw water supply pipe, separate pipes connecting the upper portion of each of said cells with said raw water supply pipe, a separate shut-off valve in each of said cell connecting pipes, separate drain pipes extending from said cell connecting pipes on the cell side of each of said shut-off valves, separate shut-off valves in each of said drain pipes, and a common water collection means extending across the bottom portion of said tank and providing a passage therein in open communication with the lower portion of each of said cells, whereby any one of said cells can be automatically backwashed with filtered water during normal filtration operations by simply closing the shut-off valve in the connecting pipe to said cell and opening the shut-off valve in the drain pipe from the same connecting pipe.

2. The apparatus of claim 1 wherein said water collecting means includes an underdrain plate extending beneath each of said cells for the length of said tank and being spaced upwardly from the bottom of said tank to provide said passage therebetween, said underdrain plate being provided with a plurality of laterally and longitudinally distributed openings therethrough, said openings providing for open communication between the lower portion of each of said cells and said passage therebeneath.

References Cited in the file of this patent

UNITED STATES PATENTS

| | | |
|---|---|---|
| 477,727 | Williamson | June 28, 1892 |
| 514,531 | Williamson | Feb. 13, 1894 |
| 647,780 | Wilson | Apr. 17, 1900 |
| 768,014 | Marsh | Aug. 16, 1904 |
| 1,279,240 | Brinck | Sept. 17, 1918 |
| 2,084,659 | Streander | June 22, 1937 |
| 2,129,181 | Morse | Sept. 6, 1938 |
| 2,459,353 | Woods | Jan. 18, 1949 |
| 2,594,568 | Lawlor | Apr. 29, 1952 |

FOREIGN PATENTS

| | | |
|---|---|---|
| 21,120 | Great Britain | 1914 |
| 431,686 | Great Britain | July 8, 1935 |